(12) United States Patent
Yamamoto (10) Patent No.: US 10,873,551 B2
(45) Date of Patent: Dec. 22, 2020

(54) NOTIFICATION APPARATUS, NOTIFICATION METHOD, AND STORAGE MEDIUM (71) Applicant: NEC Corporation, Tokyo (JP)

(72) Inventor: Kazuya Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 66 days.

(21) Appl. No.: 15/838,503

(22) Filed: Dec. 12, 2017

(65) Prior Publication Data

US 2018/0183742 A1 Jun. 28, 2018

(30) Foreign Application Priority Data

Dec. 28, 2016 (JP) .................................. 2016-256230

(51) Int. Cl.
*H04L 12/58* (2006.01)
*H04L 29/08* (2006.01)
*H04W 4/029* (2018.01)

(52) U.S. Cl.
CPC .............. *H04L 51/18* (2013.01); *H04L 67/18* (2013.01); *H04L 67/26* (2013.01); *H04W 4/029* (2018.02)

(58) Field of Classification Search
CPC ......... H04L 51/18; H04L 67/18; H04L 67/26; H04W 4/029
USPC ........................................................ 709/207
See application file for complete search history.

(56) References Cited

U.S. PATENT DOCUMENTS

| 7,092,943 | B2 * | 8/2006 | Roese | G01S 5/02 |
| 7,774,363 | B2 * | 8/2010 | Lim | G06F 21/604 |
| | | | | 707/781 |
| 8,069,202 | B1 * | 11/2011 | Cona | G01C 21/3415 |
| | | | | 709/200 |
| 8,073,565 | B2 * | 12/2011 | Johnson | H04W 4/025 |
| | | | | 700/245 |
| 2009/0097414 | A1 * | 4/2009 | Yoon | G01C 21/3438 |
| | | | | 370/254 |
| 2009/0098882 | A1 * | 4/2009 | Yoon | H04M 1/72572 |
| | | | | 455/456.1 |
| 2012/0196565 | A1 * | 8/2012 | Raleigh | G06F 15/177 |
| | | | | 455/406 |

(Continued)

FOREIGN PATENT DOCUMENTS

CN 104637204 A 5/2015
EP 1562119 A1 8/2005

(Continued)

OTHER PUBLICATIONS

Singaporean Office Action for SG Application No. 10201710586T dated Jun. 16, 2020.

(Continued)

*Primary Examiner* — Kristie D Shingles (57) ABSTRACT

A notification apparatus according to an example aspect of the invention includes a memory that stores instructions; and at least one processor coupled to the memory, the at least one processor being configured to executing the instructions to: determine a second terminal from a plurality of terminals based on a distance between each of the plurality of terminals and a first terminal in a particular state; and perform a notification to a manager of the second terminal, the notification relating to a situation where the first terminal is in the particular state.

20 Claims, 8 Drawing Sheets

(56) References Cited

U.S. PATENT DOCUMENTS

| | | | | |
|---|---|---|---|---|
| 2014/0280316 A1* | 9/2014 | Ganick | ............... | G06F 16/2457 |
| | | | | 707/769 |
| 2015/0350844 A1* | 12/2015 | Agarwal | ............... | H04W 4/029 |
| | | | | 455/456.2 |
| 2016/0357624 A1 | 12/2016 | Hashimoto | | |
| 2017/0289305 A1* | 10/2017 | Liensberger | .......... | G06F 3/0484 |

FOREIGN PATENT DOCUMENTS

| | | |
|---|---|---|
| JP | H05-307693 A | 11/1993 |
| JP | H09-91220 A | 4/1997 |
| JP | 2005-031748 A | 2/2005 |
| JP | 2005-275616 A | 10/2005 |
| JP | 2008-197790 A | 8/2008 |
| JP | 4527561 B2 | 6/2010 |
| JP | 2011-053903 A | 3/2011 |
| JP | 2014-149953 A | 8/2014 |

OTHER PUBLICATIONS

Japanese Office Action for JP Application No. 2016-256230 dated Sep. 15, 2020 with English Translation.

* cited by examiner

| | IT ASSET INFORMATION | | MANAGER INFORMATION | | NETWORK INFORMATION | | | | POSITION INFORMATION |
|---|---|---|---|---|---|---|---|---|---|
| | ASSET NAME | ASSET NUMBER | MAIL ADDRESS | MANAGER NAME | NETWORK ADDRESS | IP ADDRESS | MAC ADDRESS | | POSITION |
| INFORMATION TERMINAL 200_1 | A | 1 | aa11@mail.jp | MINORU SUZUKI | 192.168.1.0 | 192.168.1.1 | 12:34:56:78:9A:01 | | 35.649422, 139.748097 |
| INFORMATION TERMINAL 200_2 | B | 2 | bb22@mail.jp | KIYOSHI TAKAHASHI | 192.168.1.0 | 192.168.1.2 | 12:34:56:78:9A:02 | | 35.649422, 139.748096 |
| INFORMATION TERMINAL 200_3 | C | 3 | cc33@mail.jp | SACHIKO TANAKA | 192.168.1.0 | 192.168.1.3 | 12:34:56:78:9A:03 | | 35.649420, 139.748097 |
| INFORMATION TERMINAL 200_4 | D | 4 | dd44@mail.jp | YOKO WATANABE | 192.168.1.0 | 192.168.1.4 | 12:34:56:78:9A:04 | | 35.649426, 139.748097 |
| .. | .. | .. | .. | .. | .. | .. | .. | | .. |
| INFORMATION TERMINAL 200_n | N | n | nnnn@mail.jp | TADASHI YAMAMOTO | 192.168.2.0 | 192.168.2.1 | 12:34:56:78:9A:a1 | | 35.572299, 139.665789 |

NOTIFICATION APPARATUS, NOTIFICATION METHOD, AND STORAGE MEDIUM

This application is based upon and claims the benefit of priority from Japanese Patent Application No. 2016-256230, filed on Dec. 28, 2016, the disclosure of which is incorporated herein in its entirety by reference.

TECHNICAL FIELD

The present disclosure relates to a technique for performing notification using an information processing apparatus.

BACKGROUND ART

In recent years, it has become common for an organization such as a company to use information terminals such as personal computers and servers to do business or work. Since information terminals usually contain confidential information, management such as protecting security is regarded as important. In particular, in organizations that own a large number of information terminals, security managers may centrally manage information about information terminals in order to manage these information terminals efficiently.

For example, a security manager checks the software version of each information terminal and manages the information terminal such that all terminals are kept up to date. In performing such management, the security manager may contact a user who manages the information terminal (hereinafter also referred to as "terminal manager" or simply "manager"). For example, when it is found that there is an information terminal in which software has not been updated, the security manager gives the terminal manager of the information terminal instructions to update the software. Upon receiving the instruction, the terminal manager appropriately performs, in accordance with the contents of the instructions, necessary measures such as, e.g., upgrading software and responding to the security manager.

Techniques for managing assets are disclosed in documents referred below, for example.

Japanese Patent Application Publication No. 2005-275616 (JP2005-275616 A) discloses an asset management server for managing the location of the device. When this asset management server has not obtained the information about the asset device for a predetermined period of time, the asset management server asks the user as to whether the asset device has been discarded.

Japanese Patent Application Publication No. 2011-053903 (JP2011-053903 A) discloses an information processing system that allows another person to manipulate a terminal when the manager of the terminal is absent. In the information processing system of JP2011-053903 A, a request to issue an account of a terminal by another person is notified to the terminal apparatus carried by the terminal manager.

Japanese Patent Application Publication No. 2008-197790 (JP2008-197790 A) discloses an asset monitor system for determining as to whether the person who is about to take out the monitor target object is an authentic applicant or not on the basis of the distance between the monitor target object and an applicant who applied to take out the monitor target object in advance. In the asset monitor system of JP2008-197790 A, the applicant receives a signal indicating that taking out of the monitor target object is allowed or disallowed.

Japanese Patent No. 4527561 (JP4527561 B) describes a technique for accurately managing asset information including information about, e.g., the user who is using the terminal.

SUMMARY

An exemplary object of the invention is to provide a notification apparatus and the like capable of efficiently giving a notification about a terminal in a particular state.

A notification apparatus according to an example aspect of the invention includes: a memory that stores instructions; and at least one processor coupled to the memory, the at least one processor being configured to executing the instructions to: determine a second terminal from a plurality of terminals based on a distance between each of the plurality of terminals and a first terminal in a particular state; and perform a notification to a manager of the second terminal, the notification relating to a situation where the first terminal is in the particular state.

A notification method according to an example aspect of the invention includes: determining a second terminal from a plurality of terminals based on a distance between each of the plurality of terminals and a first terminal in a particular state; and performing a notification to a manager of the second terminal, the notification relating to a situation where the first terminal is in the particular state.

A non-transitory computer-readable storage medium according to an example aspect of the invention stores a program that causes a computer to execute: determining a second terminal from a plurality of terminals based on a distance between each of the plurality of terminals and a first terminal in a particular state; and performing a notification to a manager of the second terminal, the notification relating to a situation where the first terminal is in the particular state.

BRIEF DESCRIPTION OF THE DRAWINGS

Exemplary features and advantages of the present invention will become apparent from the following detailed description when taken with the accompanying drawings in which.

EXAMPLE EMBODIMENT

Hereinafter, an example embodiment of the present invention will be described with reference to the drawings.

First Example Embodiment

<Configuration>

Figure 1:
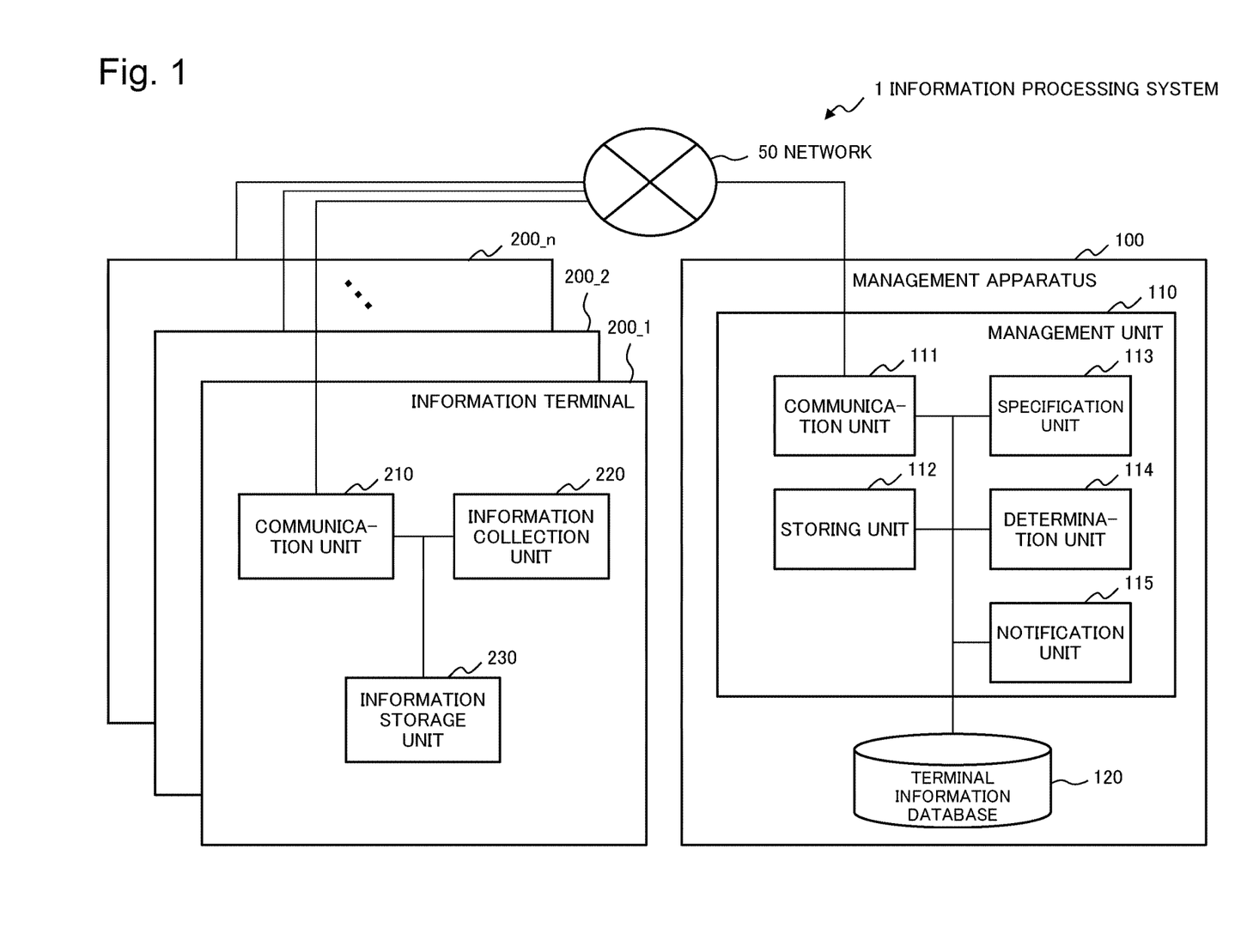
FIG. 1 is a block diagram illustrating a configuration of an information processing system according to a first example embodiment of the present invention.

FIG. 1 is a block diagram illustrating a configuration of an information processing system 1 according to the first example embodiment of the present invention. As illustrated in FIG. 1, the information processing system 1 includes a management apparatus 100, information terminals 200_1, 200_2, . . . , 200_n. In this case, n is an integer of 2 or more. In the following description, the information terminals 200_1, 200_2, . . . , 200_n are referred to as "information terminal(s) 200" when they are referred to individually without distinguishing them from each other or when they are generically referred to. The management apparatus 100 and the information terminal 200 are communicably connected to each other via a network 50.

The network 50 is a communication network such as a LAN (Local Area Network). The network 50 may apply any type of the wired type or radio type.

The management apparatus 100 manages the information terminal 200.

The information terminal 200 is an asset related to IT, or a so-called IT asset. The information terminal 200 is, for example, a device such as a PC (Personal Computer), a cellular phone, or a server. The information terminals 200 included in the information processing system 1 may be of the same type or of different types.

Hereinafter, a specific configuration of each apparatus will be described with reference to the drawings.

===Management Apparatus 100===

As shown in FIG. 1, the management apparatus 100 includes a management unit 110 and a terminal information database 120.

The management unit 110 includes a communication unit 111, a storing unit 112, a specification unit 113, a determination unit 114, and a notification unit 115.

The communication unit 111 communicates with the information terminal 200 via the network.

The storing unit 112 stores, in the terminal information database 120, the information received from the information terminal 200 via the communication unit 111. The information received from the information terminal 200 is, for example, information about the information terminal 200 and information about the manager of the information terminal 200 (details of which will be described later).

The specification unit 113 specifies a "target terminal". The "target terminal" is a terminal of which manager is supposed to be notified. The criterion specifying the "target terminal" can be freely defined. For example, the specification unit 113 detects an information terminal 200 having a problem in management and specifies the detected information terminal 200 as the "target terminal". More specifically, for example, the specification unit 113 specifies the information terminal 200 that violates a stipulated policy as the target terminal. An example of information terminal 200 which violates the stipulated policy is an information terminal 200 which has not upgraded a specified software by a designated date. Alternatively, the specification unit 113 may specify the information terminal 200 as the target terminal when receiving a specified report (e.g., a report informing that the information terminal 200 violates the information policy) from the information terminal 200.

The determination unit 114 determines the manager of the terminal different from the target terminal on the basis of the information stored in the terminal information database 120 when the target terminal is not properly managed.

The notification unit 115 performs a notification to the manager of the information terminal 200 via the communication unit 111. The notification is performed by, for example, sending an e-mail. For example, the notification unit 115 performs the notification by sending an e-mail to the e-mail address of the manager of the information terminal 200. Alternatively, the notification unit 115 may issue a notification to the information terminal 200 by instructing the information terminal 200 to output a message on a screen of the information terminal 200.

Figure 2:
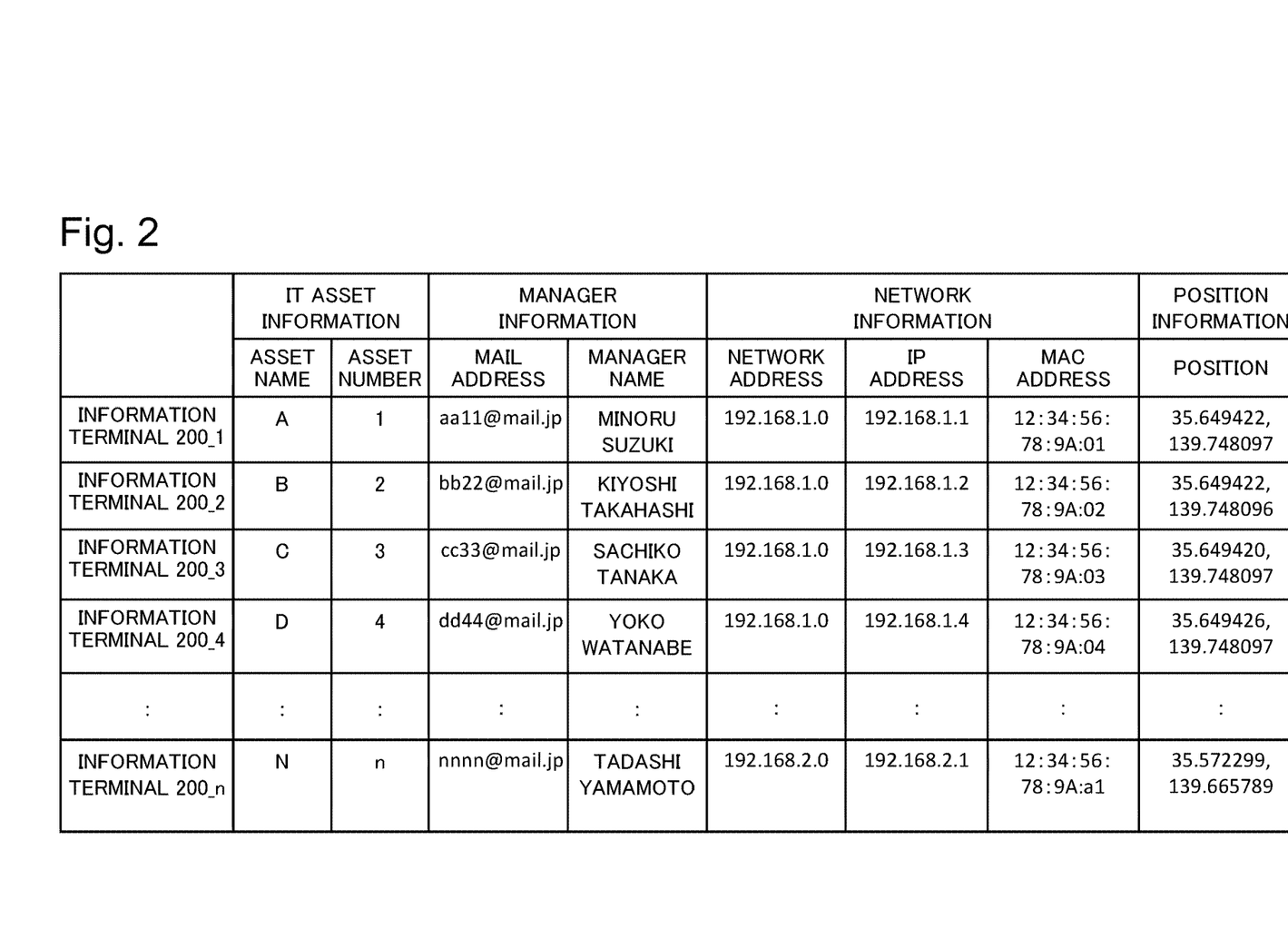
FIG. 2 illustrates an example of data stored in a terminal information database.

The terminal information database 120 stores information received by the storing unit 112 from the information terminals 200_1 to 200_n via the communication unit 111. FIG. 2 illustrates an example of data stored in the terminal information database 120. As shown in FIG. 2, the terminal information database 120 may store, in a table format, IT (Internet Technology) asset information, manager information, network information, and position information about each of the information terminals 200.

===Information Terminal 200===

Each of the information terminals 200 includes an information collection unit 220, an information storage unit 230, and a communication unit 210.

The communication unit 210 communicates with the management apparatus 100 via the network 50.

The information collection unit 220 collects the terminal information about the information terminal 200. The terminal information according to this example embodiment is information including IT asset information, manager information, network information, and position information.

The IT asset information is information including asset name (type, name, and the like), identification number, license information, and the like about the information terminal 200.

The manager information is information including information specifying the terminal manager such as a name of the manager of the information terminal 200, and information including a contact address (for example, a telephone number, a mail address, and the like).

The network information is information including a network address, an IP (Internet Protocol) address, a MAC (Media Access Control) address, and the like of the information terminal 200.

The position information is information including information indicating the location where the information terminal 200 is positioned (or the location where the information terminal 200 was positioned). As an example, the position information is represented by a set of numerical values indicating, for example, latitude and longitude.

The information collection unit 220 may include a device having a function of specifying a position using, for example, a GPS (Global Positioning System) to collect position information. The information collection unit 220 is not limited to a device having a GPS function but may include a configuration capable of acquiring position information about the information terminal 200.

The specific example of the terminal information shown above is an example. A part of the above-described information may be omitted.

The information collection unit 220 collects terminal information as necessary. For example, the information collection unit 220 may periodically acquire terminal information from a storage unit (not shown) that stores terminal information. The information collection unit 220 may acquire the terminal information from the storage unit in response to a specific event. Further, for example, the information collection unit 220 may receive an input being terminal information that is input by a user of the information terminal 200 via the input/output interface of the information terminal 200.

In one example, regarding the IT asset information, the information collection unit 220 may receive an input by the user or from the management apparatus 100 when the operation of the information terminal 200 is started. Thereafter, the information collection unit 220 does not have to collect IT asset information.

In one example, as for the manager information, the information collection unit 220 may receive an input being manager information to the information terminal 200 that is input by the user of the information terminal 200 at any time.

In one example, the information collection unit 220 may obtain the network information and the position information when the information terminal 200 is powered on and with a predetermined time interval. The network information is obtained from, for example, the name server. The position information is obtained from, for example, a device having the function of specifying the position provided in the information terminal 200.

Timing and mode of collection of terminal information is not limited to the above example.

The information collection unit 220 stores the collected terminal information in the information storage unit 230. The information storage unit 230 stores therein the terminal information collected by the information collection unit 220.

The communication unit 210 transmits the terminal information collected by the information collection unit 220 to the management apparatus 100. Each time the information collection unit 220 collects the terminal information, the communication unit 210 may transmit the terminal information to the management apparatus 100. The communication unit 210 may periodically read the terminal information stored in the information storage unit 230 and transmit the terminal information to the management apparatus 100. The communication unit 210 may transmit the terminal information to the management apparatus 100 in response to a request from the management apparatus 100.

<Operation>

Figure 3:
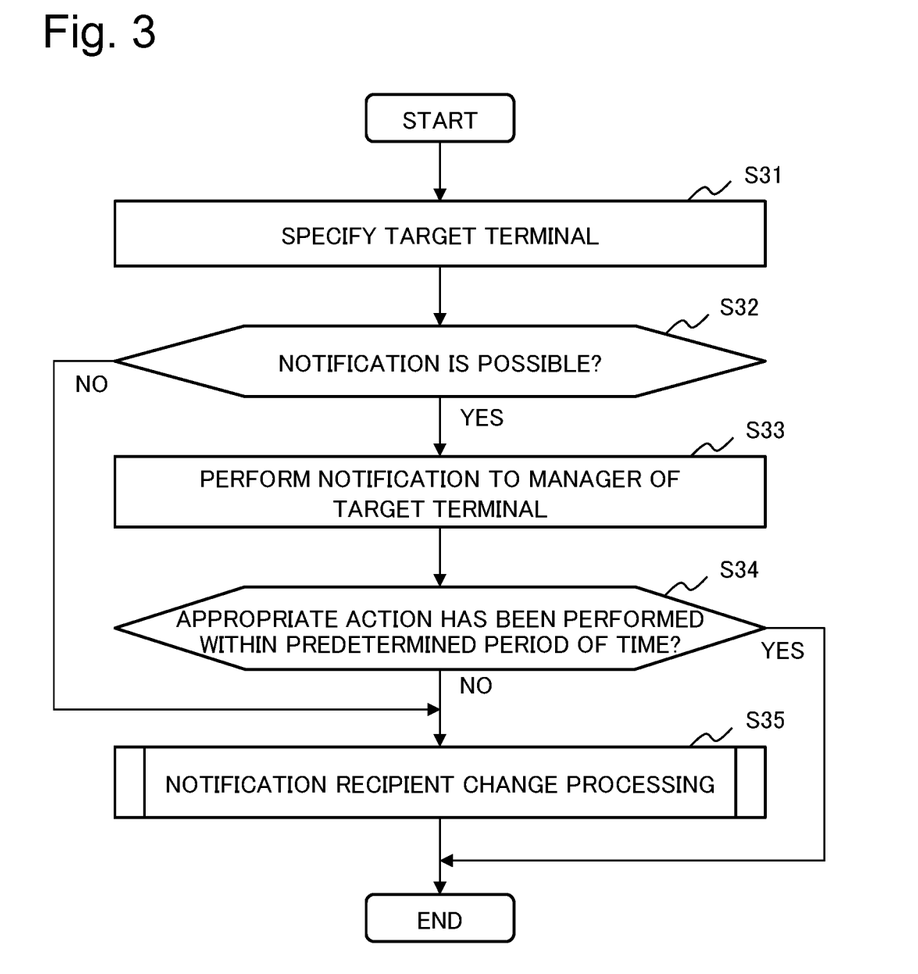
FIG. 3 is a flowchart illustrating an example of an operation of a management terminal according to the first example embodiment.

The operation of the management apparatus 100 will be described with reference to FIG. 3. The flowchart of FIG. 3 illustrates an example of the operation of the management apparatus 100, in which notification is given to the manager of the terminal.

First, the specification unit 113 of the management apparatus 100 specifies the target terminal. (Step S31). More specifically, for example, the specification unit 113 detects an information terminal 200 that has not upgraded a specified software by a designated date, and specifies the information terminal 200 as the target terminal.

When the target terminal is specified, the notification unit 115 determines whether the manager of the target terminal can be notified or not. For example, when the method of notification is e-mail only, the notification unit 115 checks whether terminal information database 120 stores the manager information (for example, mail address) of the target terminal by searching the terminal information database 120. When manager information is found, the notification unit 115 determines that notification is possible. When no manager information is found, the notification unit 115 determines that notification is not possible.

When notification is possible (YES in step S32), the notification unit 115 performs notification to the manager of the target terminal (step S33). For example, the notification unit 115 transmits an e-mail whose destination is the mail address recorded in the manager information. The notification may be, for example, a notice informing that the information policy is violated, or a notice indicating the operation required to be performed by the manager of the information terminal 200.

When notification is not possible (NO in step S32), the management apparatus 100 performs processing in step S35 described later.

After the notification in step S33 is performed, the management apparatus 100 waits until an appropriate action is performed on the target terminal. An appropriate action is, for example, elimination of violation of the information policy or execution of the operation required to be performed by the manager of the information terminal 200. The management apparatus 100 may detect that an appropriate action has been performed by receiving a notification from, for example, a notification unit (not shown) notifying that an appropriate action has been performed with the target terminal. The definition of the appropriate action may be set according to the purpose and content of the notification.

When an appropriate action has been performed within the predetermined period of time (YES in step S34), the notification is deemed to have been successfully performed, and the processing is terminated. When the appropriate action has not been performed within the predetermined period of time (NO in step S34), the notification is deemed to have failed, and the management apparatus 100 performs the processing in step S35. A case where an appropriate action has not been performed is, for example, a case where the violation of the information policy is not solved, a case where operation that is expected to be performed by the terminal manager is not performed, or the like. A case where the e-mail does not reach the recipient (because, for example, the address of the recipient of the mail is not used or is incorrect) may be included in the case where an appropriate action has not been performed.

The predetermined period of time can be set freely. The predetermined period of time is, for example, 24 hours.

Figure 4:
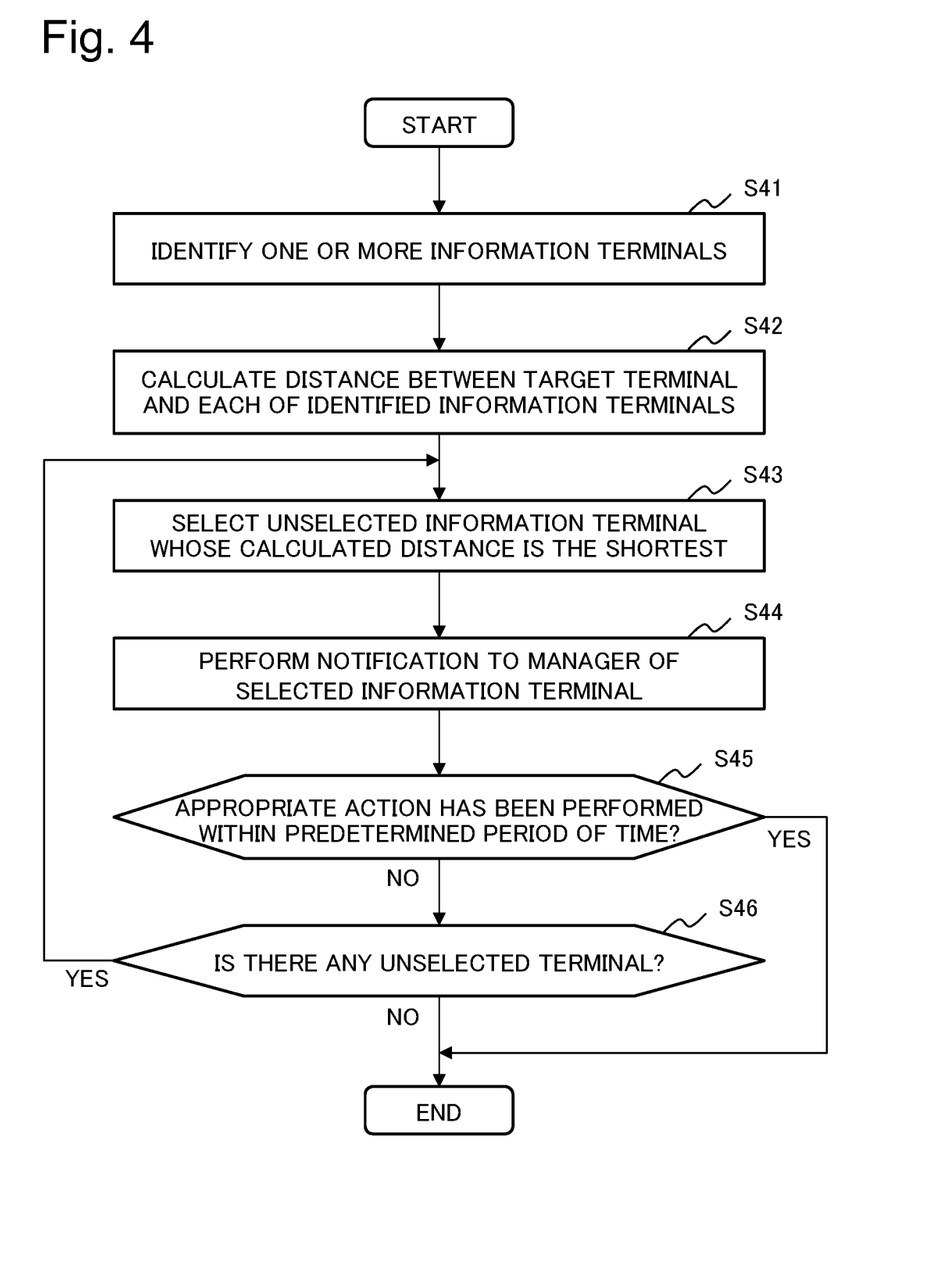
FIG. 4 is a flowchart illustrating an example of operation of notification recipient change processing of the management terminal.

The processing in step S35 is notification recipient change processing. Hereinafter, the notification recipient change processing will be described with a specific example. FIG. 4 is a flowchart illustrating an example of a specific flow of the notification recipient change processing. In this processing, it is assumed that the target terminal is the information terminal 200_1.

First, in step S41, the determination unit 114 of the management apparatus 100 identifies one or more information terminals 200 managed by another terminal manager that is a candidate for receiving a notification instead of the manager of the information terminal 200_1. The determination unit 114 identifies one or more information terminals 200 existing on the same network as the information terminal 200_1, for example, on the basis of the network information about the information terminal 200 included in the terminal information database 120. More specifically, the determination unit 114 identifies one or more information terminals 200 whose network address is the same as the network address of the information terminal 200_1. A modified example relating to a identification method by the determination unit 114 will be described later in item (2) of For example, it is assumed that the information terminals 200_2, 200_3, 200_4, and 200_5 are identified by the processing of step S41.

Subsequently, the determination unit 114 calculates the distance between the information terminal 200_1 and each of the identified information terminals 200 (step S42). The distance is, for example, a straight-line distance. The distance may be a point-to-point distance based on latitude and longitude, or may be a spatial distance considering altitude.

Figure 5:
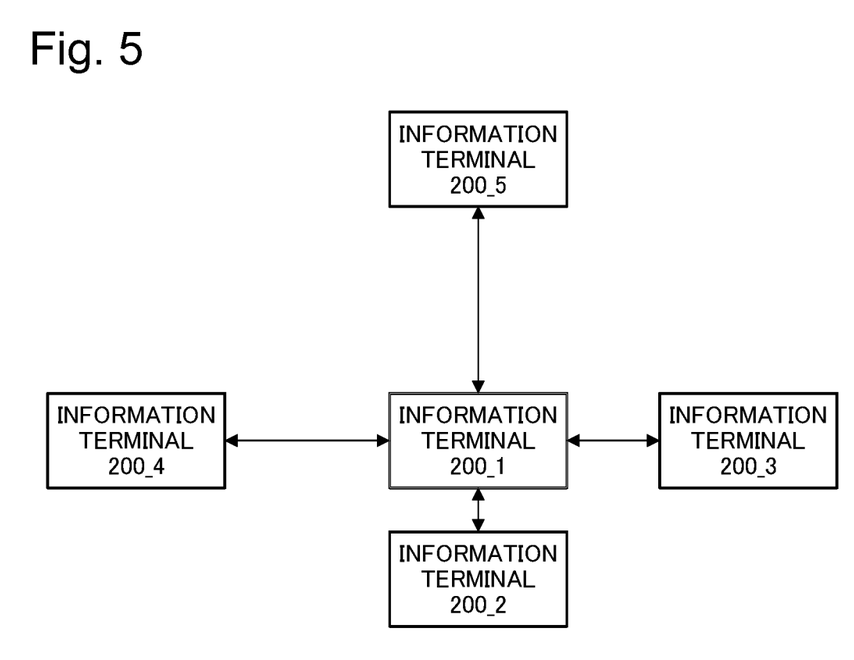
FIG. 5 illustrates an example of position relation of the information terminal.

FIG. 5 illustrates an example of a position relationship between the information terminals 200_1 and 200_5. As shown in FIG. 5, it is assumed that the information terminals 200_2, 200_3, 200_4, 200_5 are closer to the information terminal 200_1 in this order.

Then, the determination unit 114 selects an unselected information terminal whose calculated distance is the shortest among an unselected information terminal 200 (step S43). In step S43, the "unselected information terminal 200" is an information terminal which is identified in the processing of step S41 and which has not yet been selected in the processing of step S43. When the processing of step S43 is performed for the first time, the unselected information terminals 200 according to the present explanation example are information terminals 200_2 to 200_5. Therefore, the determination unit 114 first selects the information terminal 200_2 as the unselected information terminal 200 whose calculated distance is the shortest.

As a modification, the determination unit 114 may select multiple information terminals 200. For example, the determination unit 114 may select N information terminals 200 (N is an integer equal to or greater than 2) in the ascending order of the distance. Alternatively, the determination unit 114 may select all the information terminals 200 that satisfy the predetermined distance criteria (e.g., within 10 m, and the like).

When the information terminal 200 is selected, the notification unit 115 performs notification to the manager of the selected information terminal (200_2) (step S44). The notification may be, for example, a notification indicating that the information terminal 200_1 is in violation of the information policy, or a notification including contents inquiring the manager of the information terminal 200_1. The notification may be an instruction to solve the policy violation on the target terminal.

In a mode in which the notification unit 115 can communicate with the information terminal 200_2, the notification unit 115 may send a notification to the information terminal 200_2. For example, the notification unit 115 may transmit to the information terminal 200_2 an instruction to display the notification on the screen of the information terminal 200_2.

Upon notification, the notification unit 115 may refer to the terminal information stored in the terminal information database 120. When the notification unit 115 performs a notification by sending an e-mail, the notification unit 115 reads the mail address of the manager of the selected information terminal 200 from the terminal information database 120. At this time, when there is no manager mail address of the selected information terminal 200 (i.e., when there is no way to perform notification), the determination unit 114 selects the information terminal again (i.e., the process returns back to the processing of step S43).

The notification unit 115 may perform the notification to the manager of the selected information terminal 200_2 via the information terminal other than the information terminal 200_2 managed by the manager. For example, when the manager is managing the information terminal 200_6, the notification unit 115 may transmit, to the information terminal 200_6, an instruction to display the notification on the information terminal 200_6.

After performing the notification, the communication unit 111 waits for an appropriate action for the target terminal 200_1. The communication unit 111 may determine a presence or absence of an appropriate action based on the report from the target terminal 200_1 and/or a report from the terminal manager to which the notification is given. In this case, the appropriate action is, for example, a notification indicating that update of the specified software has been executed, a report that the manager information of the target terminal 200_1 has been reset, and the like. The communication unit 111 may determine that an appropriate action has been performed when the communication unit 111 receives, from the terminal manager to which the notification is given, a notification indicating that an appropriate action has been performed on the target terminal 200_1. The appropriate action can be freely set according to the type of notification and embodiment. When the manager information about the terminal manager to which a notification is given is wrong, the management apparatus 100 may determine that an appropriate action has not been performed.

When an appropriate action has been performed within the predetermined period of time (YES in step S45), the notification is deemed to have been successfully performed, and accordingly, the notification recipient change processing is terminated. Thereafter, the management apparatus 100 performs an appropriate action based on the performed action. For example, the management apparatus 100 may again confirm that the target terminal meets the information policy.

When an appropriate action has not been performed within the predetermined period of time (NO in step S45), the management apparatus 100 performs processing for notifying the manager of another information terminal 200. More specifically, when there is an unselected information terminal 200 (YES in step S46), the determination unit 114 again selects the information terminal 200 in step S43 (thereby, in the present example, the information terminal 200_3 is selected). When there is no unselected information terminal 200 (NO in step S46), the notification recipient change processing is terminated. In such a case, for example, the management apparatus 100 may try to perform notification using a method different from the notification recipient change processing. For example, the management apparatus 100 may output an alert to manager of management apparatus 100.

When the determination unit 114 selects another information terminal (e.g., the information terminal 200_3) (after the second execution of step S43), the notification unit 115 performs notification to a manager of the selected information terminal 200. The notification in such a case may be a notification about the target terminal or a notification about an information terminal having been selected (e.g., the information terminal 200_2). Further, the specification unit 113 may specify the already selected information terminal 200 as a new target terminal.

Effects

According to the management apparatus 100 of the first example embodiment, when the manager of the information terminal does not exist or a notification cannot be given to the manager or the manager does not perform an appropriate action, a notification can be given to an another manager who is likely to be at a position close to that information terminal (target terminal). This is because the specification unit 113 specifies the target terminal, and the determination unit 114 identifies one or more information terminals, and selects the information terminal on the basis of the distance between the target terminal and the identified information terminal, and the notification unit 115 performs notification to a manager of the selected information terminal.

By performing notification to the manager of the selected information terminal, the manager is promoted to solve management problems occurring in the target terminal. Namely, the procedure for managing the target terminal can be performed more efficiently.

(1) In step S41, the determination unit 114 may identify only information terminals 200 capable of being notified. With such a configuration, it is possible to avoid a situation in which a notification cannot be given to the information terminal 200 selected in step S43.

(2) In step S41, the determination unit 114 may identify one or more information terminals 200 on the basis of various other conditions. For example, the determination unit 114 may identify only target terminals whose altitude is at the same level as that of the target terminal. When the altitude is different, even when the straight-line distance is short, there is a high possibility that the relationship may be distant, and a lot of time and effort may be required to take an action (for example, it may be necessary to use the stairs to go to a place where the target terminal is). Incidentally, "the same level" means, for example, that the difference is equal to or less than a predetermined value. The predetermined value may be determined, for example, based on a height difference between the floors in a building where target terminal is located. For example, when the height difference between the floors in the building where the target terminal is located is 3 meters, the determination unit 114 may select the information terminal from the terminals located at an altitude within 3 meters from the altitude where the target terminal is located.

As another example, groups may be allocated to each information terminal 200 in advance. Then, the determination unit 114 may identify information terminals 200 which belong to the same group as the target terminal in step S41.

As another example, an identifier of an area based on predefined classification may be assigned to positions of each information terminal 200. For example, the terminal information database 120 may store the identifier of the area where each information terminal 200 is located as position information. Then, the determination unit 114 may identify the information terminal 200 on the basis of the information of the area in step S41. For example, the terminal information database 120 may identify information terminals 200 located in the same area as the target terminal.

As another example, when each information terminal 200 uses the wireless LAN, the determination unit 114 may identify information terminals 200 having an access point common to the target terminal.

(3) In step S43, the determination unit 114 may preferentially select the information terminal 200 at the same altitude as the target terminal. For example, the determination unit 114 may set a weight according to the difference in the altitude between the information terminal and the target terminal in step S43. For example, the determination unit 114 calculates a value obtained by multiplying the straight-line distance (which may or may not include the altitude) between the information terminal and the target terminal by the difference in the altitude between the information terminal and the target terminal, and may select an information terminal of which calculated value is the smallest. The method of setting the weight according to the difference in the altitude can be designed in any way other than the example described above.

(4) In step S42, the determination unit 114 may calculate a temporal distance instead of a spatial distance as each distance. The temporal distance is a numerical value depending on the time it takes to move between two points. When the time distance is shorter, the labor and the cost for a person having received a notification to go to the place of the target terminal is smaller. Therefore, there is a possibility that a notification is performed to a more appropriate manager, and the management is expected to be carried out more efficiently. Therefore, for example, the determination unit 114 may estimate each time it takes to move between the position where the target terminal is located and the position where each information terminal is located, and may use a value depending on the estimated time as the distance.

(5) The position information may not be represented by a numerical value. For example, the position information may be an identifier of one of identified sections. The management apparatus 100 may have information that can specify the position relationship or distance relationship of each section. For example, the position information about the target terminal 200_1 indicates "section A", the position information of the information terminal 200_2 indicates "section B", the position information of the information terminal 200_3 indicates "section C", and the management apparatus 100 has information indicating that the section B is closer to the section A than the section C. In such a case, first, the determination unit 114 selects the information terminal 200_2.

Figure 6:
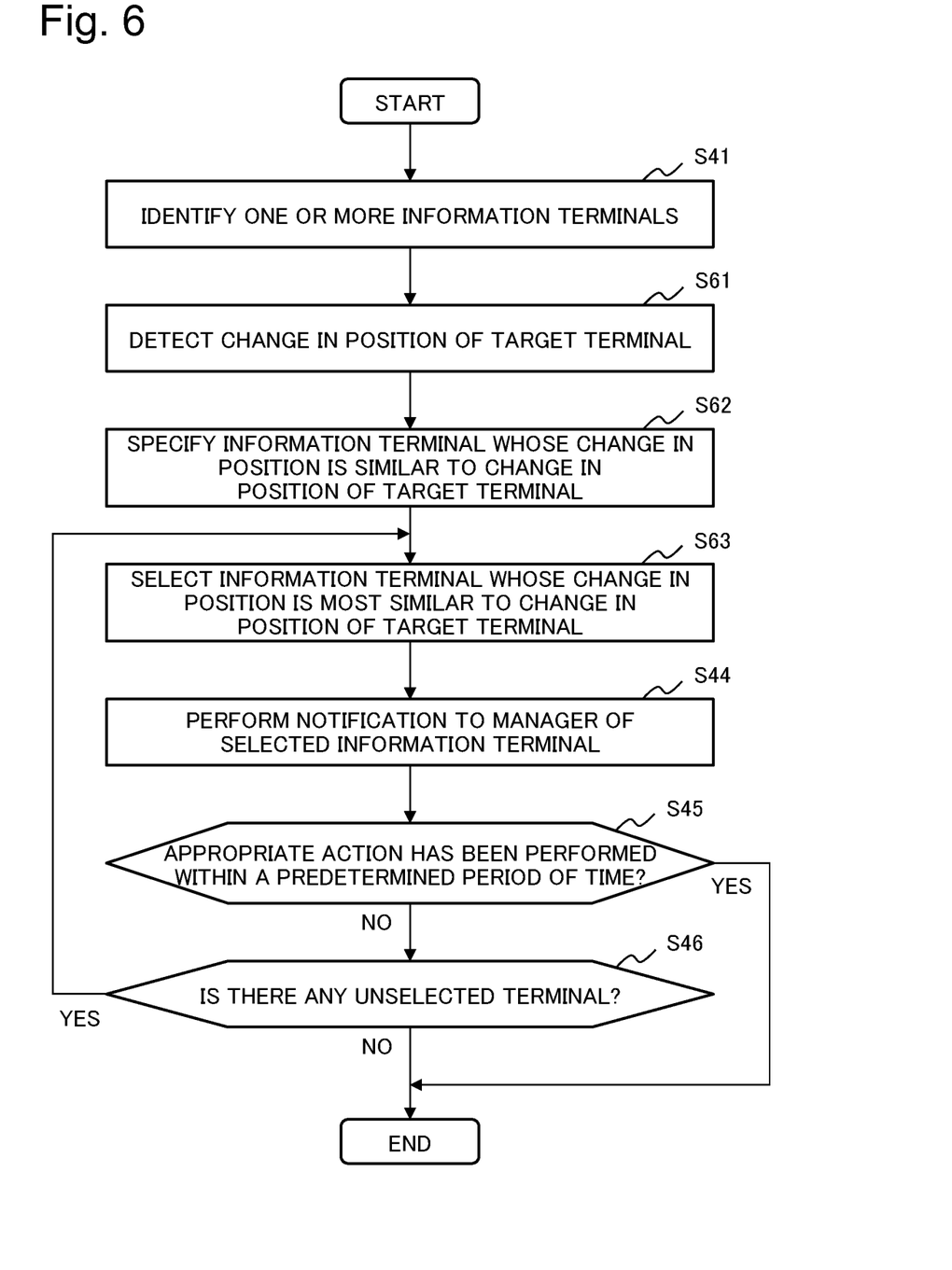
FIG. 6 is a flowchart illustrating another example of operation of notification recipient change processing of the management terminal.

(6) The terminal information database 120 may store the history of position information. Then, the determination unit 114 may use the past position information of the information terminal 200 when selecting the information terminal. As an example, the management apparatus 100 may perform processing according to the flowchart shown in FIG. 6. FIG. 6 is a modification of the flowchart of FIG. 4.

In the flowchart shown in FIG. 6, the processing of step S42 and S43 of the flowchart shown in FIG. 4 are replaced with the processing of step S61 to step S63. The processing of step S41, step S44 and subsequent steps may be the same as the processing described above.

In step S61, the determination unit 114 detects a change in the position of the target terminal. More specifically, the determination unit 114 refers to past position information of the target terminal stored in the terminal information database 120, and detects time when the position of the target terminal changed in the past. In other words, the determination unit 114 detects at least two points in time with different position information. Then, a transition of the position information at the at least two points in time is defined as "change in the position of the target terminal".

In step S62, the determination unit 114 specifies an information terminal 200 whose change in the position is similar to the change in the position of the target terminal. More specifically, the determination unit 114 obtains the position information about each of the identified information terminals at the at least two points in time detected in step S61. Then, the determination unit 114 specifies the information terminal 200 whose change in the position is similar to the change in the position of the target terminal. "Change in the position is similar to . . . " means that, for example, the distance from the target terminal is almost unchanged (e.g., the change amount is less than or equal to a predetermined value) before and after the change in the position of the target terminal.

In step S63, the determination unit 114 selects an information terminal 200 whose change in the position is the most similar to the change in the position of the target terminal.

According to the method of selection as described above, the information terminal 200 selected by the determination unit 114 is likely to be the information terminal 200 of the manager who takes the same action as the manager of the target terminal. Therefore, a notification can be given to the manager that may be more likely to take an action. In other words, a more efficient notification can be performed.

<<Main Configuration>>

Figure 7:
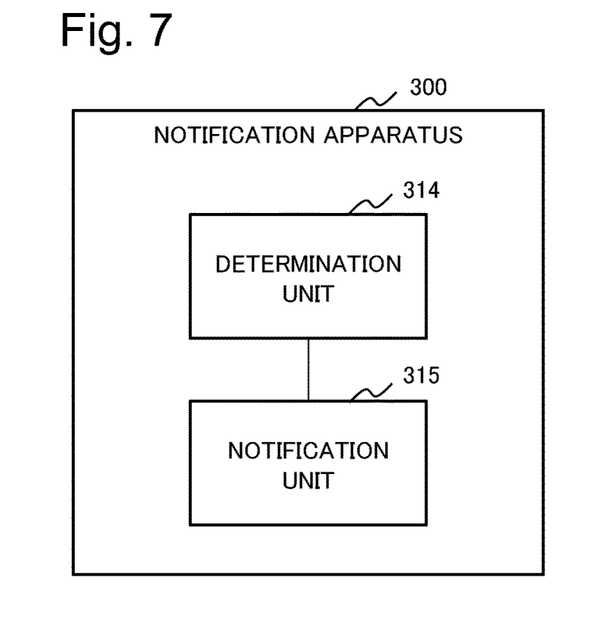
FIG. 7 is a block diagram illustrating a configuration of a notification apparatus according to one example embodiment of the present invention.

A notification apparatus 300 according to one example embodiment of the present invention will be described. FIG. 7 is a block diagram illustrating the configuration of the notification apparatus 300. The notification apparatus 300 includes a determination unit 314 and a notification unit 315.

The determination unit 314 determines from the plurality of terminals a second terminal on the basis of the distance between each of the plurality of terminals and a first terminal. The first terminal is specified, for example, by the specification unit 113 or the like according to the first example embodiment. The first terminal is a terminal in a particular state. The particular state may be defined as, for example, a state satisfying at least any one of a state where the manager information that is set for the terminal is invalid (this includes both the situation where the manager information is unregistered and incorrect) and a state where the terminal is out of a predetermined standard regarding management (such as information policy and the like).

The notification unit 315 performs a notification to the manager of the second terminal, the notification relating to the situation where the first terminal is in the particular state. The notification includes, for example, at least any one of information indicating that the first terminal is in the particular state and an instruction to release the first terminal from the particular state.

Figure 8:
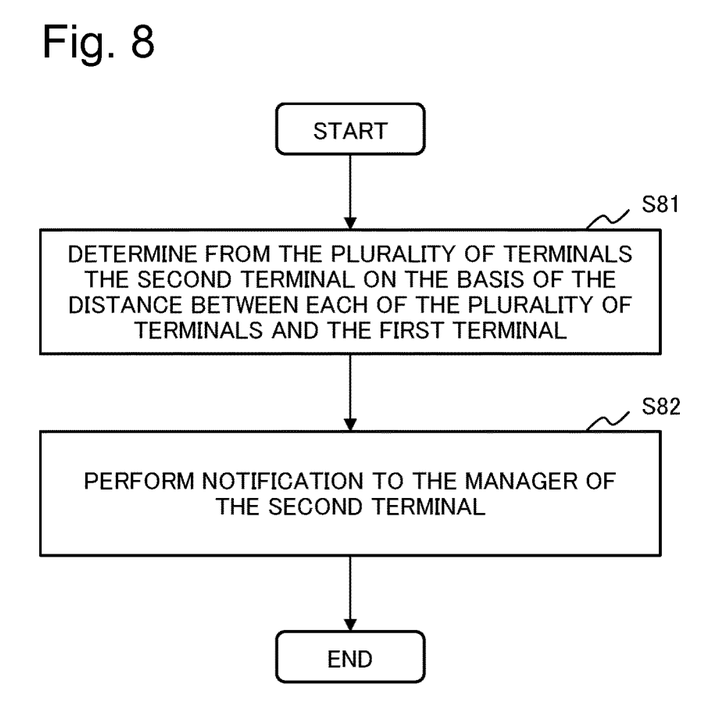
FIG. 8 is a flowchart illustrating operation of a notification apparatus according to one example embodiment of the present invention.

A flow of operation of the notification apparatus 300 will be explained with reference to the flowchart of FIG. 8. First, the determination unit 314 determines from the plurality of terminals the second terminal on the basis of the distance between each of the plurality of terminals and the first terminal (step S81). The notification unit 315 then performs a notification to the manager of the second terminal, the notification relating to the situation where the first terminal is in the particular state (step S82).

According to the notification apparatus 300, a notification relating to the situation where the terminal in the particular state can be performed efficiently. As a result, the notification apparatus 300 can prompt the manager of a second terminal other than the manager of the terminal to perform an appropriate action on the terminal in the particular state even when the information about the manager of the terminal is illegal.

(Configuration about Hardware Achieving Each Unit According to Example Embodiments)

In each example embodiment of the present invention described above, each of the constituent elements of each apparatus is denoted by a block for each function.

The processing of each constituent element may be achieved, for example, by causing a computer system to read and execute a program which causes the computer system to execute the processing, which is stored in a computer-readable storage medium. The "computer-readable storage medium" is, for example, a portable medium such as an optical disk, a magnetic disk, a magneto-optical disk, and a nonvolatile semiconductor memory, and a storage medium such as a ROM (Read Only Memory) and a hard disk built in the computer system. The examples of the "computer-readable storage medium" include those that hold a program dynamically for a short time, such as, for example, a communication line for sending a program via a network such as the Internet and a communication line such as a telephone line, and include those that temporarily hold a program such as a volatile memory inside a computer system that corresponds to a server and a client in an embodiment where the program is transmitted via a network or a communication link. The program may be a program that achieves part of the above-described functions, and further may be a program that achieves the above-described function in combination with one or more programs that are already stored in the computer system.

Figure 9:
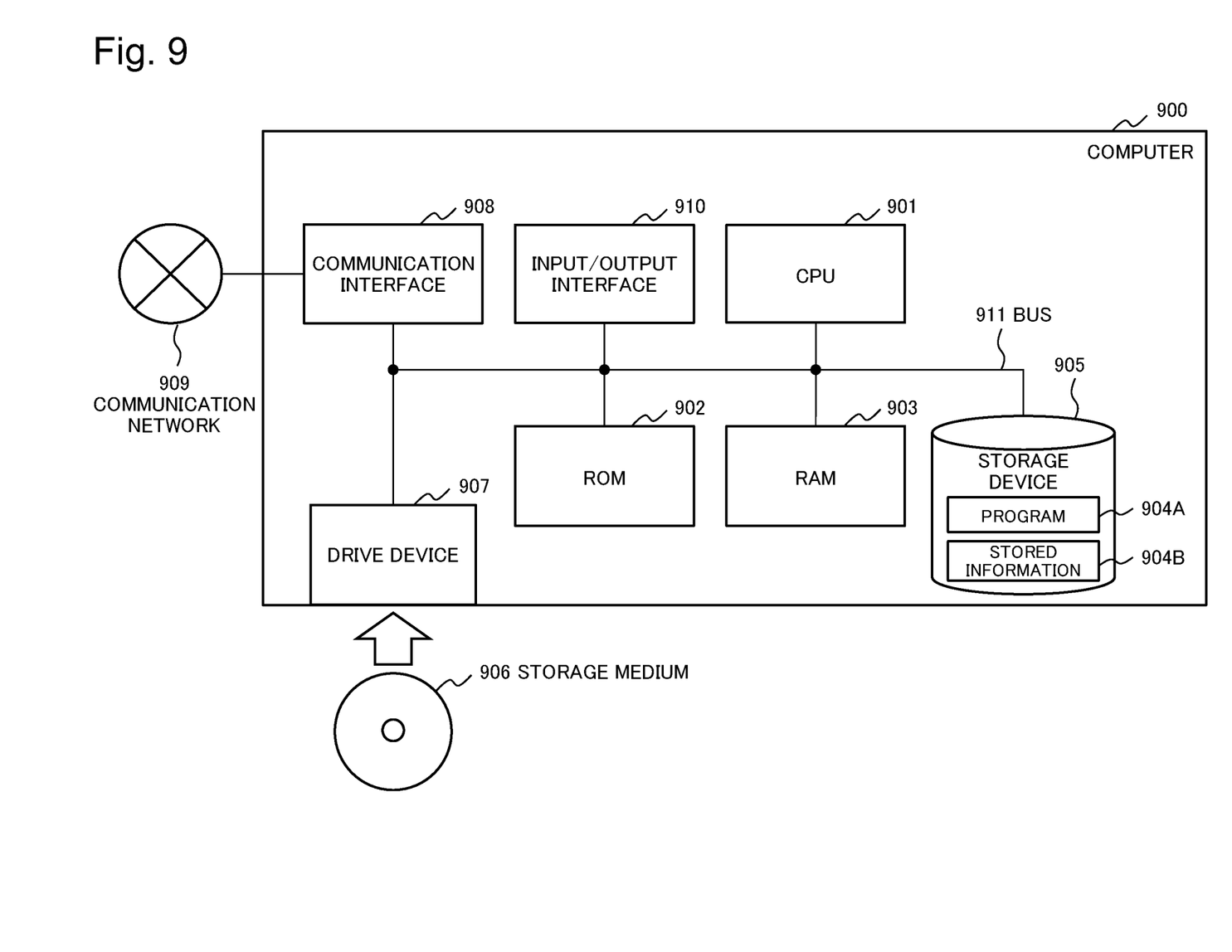
FIG. 9 is a block diagram illustrating an example of a configuration of a hardware achieving each unit in each example embodiment of the present invention.

A non-limiting example of the "computer system" is a system including a computer 900 as shown in FIG. 9. The computer 900 includes the following components:

One or more CPUs (Central Processing Units) 901;
a ROM 902;
a RAM (Random Access Memory) 903;
a program 904A and stored information 904B loaded to RAM 903;
a storage device 905 storing therein the program 904A and the stored information 904B;
a drive device 907 for reading and/or writing data from/into storage medium 906
a communication interface 908 connected to a communication network 909;
an input/output interface 910 for inputting and outputting data;
a bus 911 for connecting each constituent element;

For example, each constituent element of each apparatus according to each example embodiment is achieved by the CPU 901 loading the program 904A for achieving the function of the constituent element into the RAM 903 and executing the program 904A. The program 904A which for achieving the function of each constituent element of each apparatus is stored in, for example, the storage device 905 or the ROM 902 in advance. The CPU 901 reads the program 904A as necessary. The storage device 905 is, for example, a hard disk. The program 904A may be supplied to the CPU 901 via the communication network 909 or may be stored in advance in the storage medium 906 and may be read out to the drive apparatus 907 and supplied to the CPU 901. The storage medium 906 is, for example, a portable medium such as an optical disk, a magnetic disk, a magneto-optical disk, and a nonvolatile semiconductor memory.

There are various modifications in the method for implementing each apparatus. For example, each apparatus may be achieved by a possible combination of computers 900 and programs individually provided for the constituent elements. A plurality of constituent elements of each apparatus may be achieved by an available combination of one computer 900 and a program.

Some or all of the constituent elements of each apparatus may be achieved by other general-purpose or dedicated circuit, computer, and the like, or a combination thereof. Some or all of the constituent elements may be achieved by a single chip or may be achieved by a plurality of chips connected to one another via a bus.

In an embodiment where some or all of the constituent elements of each apparatus are achieved by a plurality of computers, circuits, and/or the like, the plurality of computers, circuits, and/or the like may be arranged centrally or in a distributed manner. For example, the plurality of computers, circuits, and/or the like may be achieved in a form in which they are connected via a communication network, such as a client and server system, a cloud computing system, and the like.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

<Supplementary Notes>

(Supplementary Note 1)

A notification apparatus comprising:

a memory that stores instructions; and at least one processor coupled to the memory, the at least one processor being configured to executing the instructions to:

determine a second terminal from a plurality of terminals based on a distance between each of the plurality of terminals and a first terminal in a particular state; and perform a notification to a manager of the second terminal, the notification relating to a situation where the first terminal is in the particular state.

(Supplementary Note 2)

The notification apparatus according to Supplementary Note 1, wherein the particular state is a state satisfying at least one of a state in which the manager information that is set for the first terminal is invalid and a state in which the first terminal is out of a predetermined standard regarding management.

(Supplementary Note 3)

The notification apparatus according to Supplementary Note 1 or 2, wherein the notification includes at least any one of piece of information indicating that the first terminal is in the particular state and an instruction to release the first terminal from the particular state.

(Supplementary Note 4)

The notification apparatus according to any one of Supplementary Notes 1 to 3, wherein the at least one processor is configured to determine the second terminal further based on an altitude of the position where the first terminal is located.

(Supplementary Note 5)

The notification apparatus according to Supplementary Note 4, wherein the at least one processor is configured to determine the second terminal from the plurality of terminals which are located at an altitude within a predetermined value from an altitude where the first terminal is located.

(Supplementary Note 6)

The notification apparatus according to any one of Supplementary Notes 1 to 5, wherein the at least one processor is configured to: estimate a time it takes for a person to move between a position where one of the plurality of terminals is located and a position where the first terminal is located; and use a value depending on the estimated time as the distance.

(Supplementary Note 7)

The notification apparatus according to Supplementary Note 1, wherein the at least one processor is further configured to:

when the second terminal is in the particular state, determine a third terminal from the plurality of terminals based on the distance from the first terminal, and perform a second notification to a manager of the third terminal, the second notification relating to at least one of the situation where the first terminal is in the particular state and a situation where the second terminal is in the particular state.

(Supplementary Note 8)

The notification apparatus according to any one of Supplementary Notes 1 to 7, wherein the at least one processor is configured to determine the second terminal, based on a similarity between a change of a position of the first terminal and a change of a position of one of the plurality of terminals.

(Supplementary Note 9)

A notification method performed by a computer, the notification method comprising:

determining a second terminal from a plurality of terminals based on a distance between each of the plurality of terminals and a first terminal in a particular state; and performing a notification to a manager of the second terminal, the notification relating to a situation where the first terminal is in the particular state.

(Supplementary Note 10)

The notification method according to Supplementary Note 9, wherein the particular state is a state satisfying at least one of a state in which the manager information that is set for the first terminal is invalid and a state in which the first terminal is out of a predetermined standard regarding management.

(Supplementary Note 11)

The notification method according to Supplementary Note 9 or 10, wherein the notification includes at least any one of piece of information indicating that the first terminal is in the particular state and an instruction to release the first terminal from the particular state.

(Supplementary Note 12)

The notification method according to any one of Supplementary Notes 9 to 11, wherein determining the second terminal includes using an altitude of the position where the first terminal is located.

(Supplementary Note 13)

The notification method according to Supplementary Note 12, wherein the second terminal is determined from the plurality of terminals which are located at an altitude within a predetermined value from an altitude where the first terminal is located.

(Supplementary Note 14)

The notification method according to any one of Supplementary Notes 9 to 13 further comprising: estimating a time it takes for a person to move between a position where one of the plurality of terminals is located and a position where the first terminal is located; and using a value depending on the estimated time as the distance.

(Supplementary Note 15)

The notification method according to Supplementary Note 9 further comprising:

determining, when the second terminal is in the particular state, a third terminal from the plurality of terminals based on the distance from the first terminal, and performing a second notification to a manager of the third terminal, the second notification relating to at least one of the situation where the first terminal is in the particular state and a situation where the second terminal is in the particular state.

(Supplementary Note 16)

The notification method according to any one of Supplementary Notes 9 to 15, wherein determining the second terminal is performed based on a similarity between a change of a position of the first terminal and a change of a position of one of the plurality of terminals.

(Supplementary Note 17)

A non-transitory computer-readable storage medium storing a program that causes a computer to execute:

determining a second terminal from a plurality of terminals based on a distance between each of the plurality of terminals and a first terminal in a particular state; and performing a notification to a manager of the second terminal, the notification relating to a situation where the first terminal is in the particular state.

(Supplementary Note 18)

Supplementary Note 17, wherein the particular state is a state satisfying at least one of a state in which the manager information that is set for the first terminal is invalid and a state in which the first terminal is out of a predetermined standard regarding management.

(Supplementary Note 19)

The storage medium according to Supplementary Note 17 or 18, wherein the notification includes at least any one of piece of information indicating that the first terminal is in the particular state and an instruction to release the first terminal from the particular state.

(Supplementary Note 20)

The storage medium according to any one of Supplementary Notes 17 to 19, wherein determining the second terminal includes using an altitude of the position where the first terminal is located.

(Supplementary Note 21)

The storage medium according to Supplementary Note 20, wherein the second terminal is determined from the plurality of terminals which are located at an altitude within a predetermined value from an altitude where the first terminal is located.

(Supplementary Note 22)

The storage medium according to any one of Supplementary Notes 17 to 21, wherein the program further causes the computer to execute: estimating a time it takes for a person to move between a position where one of the plurality of terminals is located and a position where the first terminal is located; and using a value depending on the estimated time as the distance.

(Supplementary Note 23)

The storage medium according to Supplementary Note 17, wherein the program further causes the computer to execute:

determining, when the second terminal is in the particular state, a third terminal from the plurality of terminals based on the distance from the first terminal, and performing a second notification to a manager of the third terminal, the second notification relating to at least one of the situation where the first terminal is in the particular state and a situation where the second terminal is in the particular state.

(Supplementary Note 24)

The storage medium according to any one of Supplementary Notes 17 to 23, wherein determining the second terminal is performed based on a similarity between a change of a position of the first terminal and a change of a position of one of the plurality of terminals.

As can be seen in the above patent documents JP2005-275616 A, JP2011-053903 A, and JP2008-197790 A, information about the terminal manager which is previously registered is usually used as the notification to the terminal manager. However, for example, in a case where the information about the terminal manager is not registered, or the information about the terminal manager has not been updated even though the terminal manager has retired from the company, there is a problem in that a notification may not be not appropriately given to the terminal manager.

The technique disclosed in JP4527561 B is a technique aimed at preventing the above problem. However, in the technique disclosed in JP4527561 B, the information terminal is assumed that the user periodically logs in to the terminal using the user's ID (Identifier).

Moreover, even though the information about the terminal manager is accurate, the terminal manager does not necessarily respond appropriately to the notification.

When it is difficult to contact the terminal manager, possible measures may be specifying the current terminal manager or contacting the manager of another terminal as a possible method to properly manage the terminal. In such a case, information about the organization and the location to which the manager of the terminal belongs and the information about the relationship of members constituting the organization are clues. However, when such information is also incomplete, it is difficult or troublesome to specify the current terminal manager and to select the person to whom a message regarding the terminal in question is given.

In contrast, according to the notification apparatus according to one example embodiment of the present invention, it is possible to efficiently perform notification about the terminal in a particular state.

The invention claimed is:

1. A notification apparatus comprising:

a memory that stores instructions; and at least one processor coupled to the memory, the at least one processor being configured to executing the instructions to:

detect an occurrence of a stipulated policy violation of a first terminal or a manager information invalidity of the first terminal;

in response to detecting the occurrence of the stipulated policy violation of the first terminal or the invalidity of the first terminal, transmit, to a user of the first terminal, a notification of the stipulated policy violation of the first terminal or the manager information invalidity of the first terminal;

determine that transmission of the notification to the user of the first terminal has failed;

in response to determining that transmission of the notification to the user of the first terminal has failed, identify a second terminal from a plurality of terminals based on a distance between the first terminal and the second terminal; and after identifying the second terminal, transmit, to a user of the second terminal identified based on the distance between the first terminal and the second terminal, the notification of the stipulated policy violation of the first terminal or the manager information invalidity of the first terminal.

2. The notification apparatus according to claim 1, wherein the manager information is invalid when the manager information is unregistered or incorrect.

3. The notification apparatus according to claim 1, wherein the notification includes at least any one of piece of information indicating how to resolve the stipulated policy violation or the manager information invalidity.

4. The notification apparatus according to claim 1, wherein the at least one processor is configured to identify the second terminal further based on an altitude of the position where the first terminal is located.

5. The notification apparatus according to claim 4, wherein the at least one processor is configured to identify the second terminal from the plurality of terminals which are located at an altitude within a predetermined value from an altitude where the first terminal is located.

6. The notification apparatus according to claim 1, wherein the at least one processor is configured to:
estimate a time for a person to move between a position where one of the plurality of terminals is located and a position where the first terminal is located; and
use a value depending on the estimated time as the distance.

7. The notification apparatus according to claim 1, wherein the at least one processor is further configured to:
when the second terminal is in a particular state, determine a third terminal from the plurality of terminals based on the distance from the first terminal, and
perform a second notification to a user of the third terminal, the second notification relating to at least one of the stipulated policy violation, the manager information invalidity, and a situation where the second terminal is in the particular state.

8. The notification apparatus according to claim 1, wherein the at least one processor is configured to identify the second terminal, based on a similarity between a change of a position of the first terminal and a change of a position of one of the plurality of terminals.

9. A notification method performed by a computer, the notification method comprising:
detecting an occurrence of a stipulated policy violation of a first terminal or a manager information invalidity of the first terminal;
in response to detecting the occurrence of the stipulated policy violation of the first terminal or the invalidity of the first terminal, transmitting, to a user of the first terminal, a notification of the stipulated policy violation of the first terminal or the manager information invalidity of the first terminal;
determining that transmission of the notification to the user of the first terminal has failed;
in response to determining that transmission of the notification to the user of the first terminal has failed, identifying a second terminal from a plurality of terminals based on a distance between the first terminal and the second terminal; and
after identifying the second terminal, transmit, to a user of the second terminal identified based on the distance between the first terminal and the second terminal, the notification of the stipulated policy violation of the first terminal or the manager information invalidity of the first terminal.

10. The notification method according to claim 9, wherein the manager information is invalid when the manager information is unregistered or incorrect.

11. The notification method according to claim 9, wherein identifying the second terminal includes using an altitude of the position where the first terminal is located.

12. The notification method according to claim 9 further comprising:
estimating a time for a person to move between a position where one of the plurality of terminals is located and a position where the first terminal is located; and
using a value depending on the estimated time as the distance.

13. The notification method according to claim 9 further comprising:
determining, when the second terminal is in a particular state, a third terminal from the plurality of terminals based on the distance from the first terminal, and
performing a second notification to a user of the third terminal, the second notification relating to at least one of the stipulated policy violation, the manager information invalidity, a situation where the second terminal is in the particular state.

14. The notification method according to claim 9, wherein identifying the second terminal is performed based on a similarity between a change of a position of the first terminal and a change of a position of one of the plurality of terminals.

15. A non-transitory computer-readable storage medium storing a program that causes a computer to execute:
detecting an occurrence of a stipulated policy violation of a first terminal or a manager information invalidity of the first terminal;
in response to detecting the occurrence of the stipulated policy violation of the first terminal or the invalidity of the first terminal, transmitting, to a user of the first terminal, a notification of the stipulated policy violation of the first terminal or the manager information invalidity of the first terminal;
determining that transmission of the notification to the user of the first terminal has failed;
in response to determining that transmission of the notification to the user of the first terminal has failed, identifying a second terminal from a plurality of terminals based on a distance between the first terminal and the second terminal; and
after identifying the second terminal, transmit, to a user of the second terminal identified based on the distance between the first terminal and the second terminal, the notification of the stipulated policy violation of the first terminal or the manager information invalidity of the first terminal.

16. The storage medium according to claim 15, wherein the manager information is invalid when the manager information is unregistered or incorrect.

17. The storage medium according to claim 15, wherein identifying the second terminal includes using an altitude of the position where the first terminal is located.

18. The storage medium according to claim 15, wherein the program further causes the computer to execute:
estimating a time for a person to move between a position where one of the plurality of terminals is located and a position where the first terminal is located; and
using a value depending on the estimated time as the distance.

19. The storage medium according to claim 15, wherein the program further causes the computer to execute:
determining, when the second terminal is in a particular state, a third terminal from the plurality of terminals based on the distance from the first terminal, and
performing a second notification to a user of the third terminal, the second notification relating to at least one of the stipulated policy violation, the manager information invalidity, and a situation where the second terminal is in the particular state.

20. The storage medium according to claim 15, wherein identifying the second terminal is performed based on a similarity between a change of a position of the first terminal and a change of a position of one of the plurality of terminals.

* * * * *